United States Patent
Hutzelmann et al.

(10) Patent No.: US 10,287,973 B2
(45) Date of Patent: May 14, 2019

(54) HYDRAULIC VALVE AND CONNECTION ROD WITH THE HYDRAULIC VALVE

(71) Applicant: ECO Holding 1 GmbH, Marktheidenfeld (DE)

(72) Inventors: Stefanie Hutzelmann, Graefendorf (DE); Alexander Mudra, Goerlitz (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 59 days.

(21) Appl. No.: 15/354,011

(22) Filed: Nov. 17, 2016

(65) Prior Publication Data

US 2017/0122198 A1    May 4, 2017

(30) Foreign Application Priority Data

Nov. 4, 2015   (DE) .......................... 10 2015 118 934
Apr. 29, 2016  (DE) .......................... 10 2016 107 986

(51) Int. Cl.
*F16C 7/06*      (2006.01)
*F02B 75/04*     (2006.01)
(Continued)

(52) U.S. Cl.
CPC ............ *F02B 75/045* (2013.01); *F15B 11/20* (2013.01); *F15B 2211/7052* (2013.01);
(Continued)

(58) Field of Classification Search
CPC ................... F02B 75/045; F15B 11/20; F15B 2211/7052; F15B 2211/7656; F15B 2211/728; F16C 7/06; F16C 23/10
(Continued)

(56) References Cited

U.S. PATENT DOCUMENTS 5,275,207 A * 1/1994 Tonhauser ......... F02M 37/0023
                                                   123/198 DB
2009/0266322 A1  10/2009 Fischer
(Continued)

FOREIGN PATENT DOCUMENTS

CN       101600856 A     12/2009
CN       203742691 U      7/2014
(Continued)

*Primary Examiner* — Joseph J Dallo
*Assistant Examiner* — Yi-Kai Wang
(74) *Attorney, Agent, or Firm* — Von Rohrscheidt Patents (57) ABSTRACT

A hydraulic valve for shifting a control piston in a connecting rod of an internal combustion engine with variable compression, the hydraulic valve including a valve housing including a first operating connection and a second operating connection and a supply connection that is loadable with a hydraulic pressure of a hydraulic fluid; a step piston that is arranged in the valve housing and displaceable against a force of a preloaded spring. A first check valve is associated with the first operating connection and a second check valve is associated with the second operating connection wherein the first check valve and the second check valve open or close a connection of the first operating connection or the second operating connection with the supply connection as a function of a position of the step piston, wherein the first check valve and the second check valve is integrated into the valve housing.

23 Claims, 9 Drawing Sheets

(51) Int. Cl.
*F15B 11/20* (2006.01)
*F16C 23/10* (2006.01)

(52) U.S. Cl.
CPC . *F15B 2211/7656* (2013.01); *F15B 2211/782* (2013.01); *F16C 7/06* (2013.01); *F16C 23/10* (2013.01)

(58) Field of Classification Search
USPC ...................................... 123/48 B
See application file for complete search history.

(56) References Cited

U.S. PATENT DOCUMENTS

2014/0311586 A1* 10/2014 Becker ................ F16K 11/0704
137/15.21
2015/0075497 A1* 3/2015 Hutzelnnann ......... F02B 75/044
123/48 A
2015/0300213 A1* 10/2015 Kaufmann .............. F16K 11/10
137/625.42

FOREIGN PATENT DOCUMENTS

| DE | 102007019920 A1 | 11/2008 |
| DE | 102010060263 A1 | 5/2012 |
| DE | 102013107127 A1 | 8/2015 |
| JP | 2007536463 A | 12/2007 |

\* cited by examiner

HYDRAULIC VALVE AND CONNECTION ROD WITH THE HYDRAULIC VALVE

RELATED APPLICATIONS

This application claims priority from and incorporates by reference German Patent Application DE 10 2015 118 934.8 filed on Nov. 4, 2015 and German Patent Application DE 10 2016 107 986.3 filed on Apr. 29, 2016.

FIELD OF THE INVENTION

The invention relates to a hydraulic valve in particular for shifting a control piston in a connection rod for an internal combustion engine with variable compression and to a connecting rod with a shifting valve of this type.

BACKGROUND OF THE INVENTION

A high compression ratio in internal combustion engines has a positive effect on efficiency of the internal combustion engines. Compression ratio is typically designated as a ratio of an entire cylinder volume before compression to a remaining cylinder volume after the compression. In internal combustion engines with external ignition, in particular gasoline engines which have a fixed compression ratio the compression ratio however can only be selected up to a level so that a so called "knocking" of the internal combustion engine under full load operation if prevented. However, for partial load operations of the internal combustion engine that are much more widely used, thus with a smaller cylinder filling the compression ratio can be selected with higher values without a "knocking" occurring. The important partial load range of an internal combustion engine can be improved by making the compression ratio variably adjustable. For adjusting the compression ratio for example systems with variable connecting rod length are known which actuate an eccentrical element adjustment device of a connecting rod with hydraulic switch valves.

A hydraulic valve of this generic type and a connecting rod of this generic type are known for example from DE 10 2013 107 127 A1. In the known connecting rod a hydraulic valve is provided which includes a hydraulic supply connection. A hydraulic pressure is provided at this supply connection. The hydraulic pressure moves a hydraulic piston of the hydraulic valve against a force of a preloaded spring. The hydraulic piston remains unchanged in a stable low pressure position in a low pressure range of the supply connection due to the preload of the spring.

In this stable low pressure position the supply connection is hydraulically connected with a first displacement chamber of the connecting rod. Thus, the first displacement chamber empties in bursts towards the supply connection when its displacement chamber pressure due to gas or mass forces at the connecting rod or eccentrical element is greater than a pressure at the supply connection.

The hydraulic piston has a piston surface. When a pressure is applied to the piston surface which comes from the supply connection and the pressure is in a high pressure range, the hydraulic piston contacts a stop. In this stable high pressure position the supply connection is connected with a second displacement chamber. Thus, the second displacement chamber empties in bursts towards the supply connection when its displacement chamber pressure due to gas or mass forces at the connecting rod or at the eccentrical element is greater than a pressure at the supply connection.

Thus during adjustment the displacement chamber is not filled by the relatively low pressure from the supply connection. Instead the displacement chambers are emptied by the high forces at the connecting rod against the relatively low pressure at the supply connection. Pistons arranged in the displacement chambers operate an eccentrical element lever which in turn adjusts an effective connecting rod length through the eccentric element and thus controls the variable compression of the internal combustion engine.

BRIEF SUMMARY OF THE INVENTION

Thus, it is an object of the invention to provide an improved hydraulic valve for controlling a hydraulic fluid wherein the hydraulic valve has in particular a low amount of leakage.

It is another object of the invention to provide a connecting rod with the hydraulic valve which has a low amount of leakage.

The objects are achieved by a hydraulic valve for shifting a control piston in a connecting rod of an internal combustion engine with variable compression, the hydraulic valve including a valve housing including a first operating connection, a second operating connection and a supply connection that is loadable with a hydraulic pressure of a hydraulic fluid; a step piston that is arranged in the valve housing and displaceable by the hydraulic pressure of the hydraulic fluid against a force of a preloaded spring, wherein the step piston remains in a stable low pressure position in a first low pressure range due to a preload of the spring wherein the supply connection is connectable with the first operating connection in the stable low pressure position, wherein the step piston is in a stable high pressure position in a second high pressure range and wherein the second operating connection is connectable with the supply connection in the stable high pressure position, wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position, wherein a first check valve is associated with the first operating connection and a second check valve is associated with the second operating connection, wherein the first check valve and the second check valve open or close a connection of the first operating connection or the second operating connection with the supply connection as a function of a position of the step piston, and wherein the first check valve and the second check valve is integrated into the valve housing.

The objects are also achieved by a connecting rod for an internal combustion engine with variable compression, the connecting rod including an eccentrical element adjustment device for adjusting an effective connecting rod length, the eccentrical element adjustment device including an eccentrical element that cooperates with an eccentrical element lever, two pistons that are supported and displaceable in a respective hydraulic chamber, wherein eccentrical element rods of the eccentrical element adjustment device engaging the eccentrical element adjustment lever are supported at the two pistons, and wherein an adjustment travel of the eccentrical element adjustment device is adjustable by a hydraulic valve according to one of the preceding claims.

Advantageous embodiments and advantages of the invention can be derived from the description and the drawing figure.

A hydraulic valve is proposed, in particular for shifting a control piston in a connecting rod for an internal combustion engine with variable compression, the hydraulic valve comprising a valve housing including a first operating connection and a second operating connection and a supply connection that is loadable with a hydraulic pressure of a hydraulic fluid. A step piston that is arranged in the valve housing is displaceable in a linear manner against a force of a preloaded spring, wherein the step piston remains in a stable low pressure position in a first low pressure range due to the preload of the spring wherein the supply connection is connectable with the first operating connection in the stable low pressure position. In a second high pressure range the step piston is in a stable high pressure position in which the second operating connection is connectable with the supply connection. Furthermore an unstable transition range is provided between the two pressure ranges wherein a shifting of the piston with the shoulders from the stable low pressure range to the stable high pressure range is performed at a higher pressure than the shifting from the stable high pressure range to the stable low pressure range. A first check valve is associated with the first operating connection and a second check valve is associated with the second operating connection wherein the first and the second check valves open or close a connection of the first operating connection or the second operating connection with the supply connection as a function of a position of the step piston, wherein the check valves are integrated into the valve housing.

In the hydraulic valve according to the invention which is advantageously used as a switch over valve for shifting a control piston in a connecting rod of an internal combustion engine with variable compression two check valves are provided that are integrated into the hydraulic valve so that the check valves for the hydraulic fluid typically provided in a connecting rod for variable compression can be omitted. Only one hydraulic conduit from a bearing shell of the connecting rod to the supply connection of the hydraulic valve is required to supply the hydraulic fluid for the shifting processes. This facilitates a particular compact configuration of the connecting rod.

Alternatively the hydraulic valve can be operated in a connecting rod with existing check valves. Thus, the check valves of the hydraulic valve and of the connecting rod are only operated in series.

In the hydraulic valve according to the invention it is provided that the check valves include plungers which are made from metal and which seal against a metal valve seat. The support chambers of the connecting rod are not sealed by the piston of the hydraulic valve in the hydraulic valve but they are sealed by the plungers of the hydraulic valves against the valve seats. The piston in the hydraulic valve is only provided for actuating the plungers of the check valves. Therefore valve seals can be omitted.

This provides very reliable sealing properties of the hydraulic valve so that no leakage or only a very small amount of hydraulic fluid leakage occurs from the support chambers of the connecting rod through the operating connections of the hydraulic valve.

Since the hydraulic valve only has to seal against the relatively low supply pressure the components of the hydraulic valve can be fabricated with more clearance so that higher tolerances are permissible for fabrication which simplifies fabrication. This way the hydraulic valve is less sensitive to tolerances than comparable bi-stable switch valves.

The larger reliable clearance between the step piston and the valve housing also facilitates pressing the hydraulic valve into the connecting rod. A risk that possible deformations of the valve housing can lead to a binding of the step piston is reduced by the reduced tolerance sensitivity. Furthermore valve seals can be omitted.

Overall the hydraulic valve according to the invention offers fabrication cost advantages over conventional switch valves.

According to an advantageous embodiment the first check valve can be arranged in the low pressure position so that a connection from the supply connection to the first operating connection is released and the second check valve can be arranged so that a connection from the supply connection to the second operating connection is closed. In the high pressure position the first check valve can be arranged so that a connection from the supply connection to the first operating connection is closed and the second check valve can be arranged so that a connection from the supply connection to the second operating connection is open. This provides that only the first operating connection is loaded with hydraulic fluid in the low pressure position and only the second operating connection is loaded with hydraulic fluid in the high pressure position. The two operating connection are thus locked against each other by the check valves.

According to an advantageous embodiment the step piston can be configured hollow cylindrical at least in portions, wherein a first hollow cylindrical protrusion extends from a divider wall in one direction and a second hollow cylindrical protrusion extends from the divider wall in an opposite direction relative to a longitudinal valve axis. Thus, the first protrusion has a smaller radius than the second protrusion. Thus, a first piston surface is formed by a cross section of the first protrusion. A second piston surface is formed at least in portions by the divider wall and envelops the first protrusion as an annular disc. Thus, the spring is received in the second protrusion. The step piston is thus formed by two hollow cylinders which join with their faces at a common divider wall and which are connected by this divider wall. Thus, the divider wall forms the bases of the hollow cylinders which are thus partially formed integrally in one piece. The first piston surface of the first protrusion is formed by the face of the first protrusion due to the arrangement in the hydraulic valve. The second piston surface is formed by the portion of the divider wall which is formed outside of the base surface of the first protrusion as an annular disc about the first protrusion. The second piston surface is supplemented by the surface which is formed by a sealing edge circumferentially extending about the second protrusion on the outer circumference.

According to an advantageous embodiment the piston surfaces can be arranged transversally extending relative to the longitudinal axis wherein the radially inner first piston surface defines a first pressure cavity and the radially outer piston surface defines a second pressure cavity, wherein the two pressure cavities are separated from each other by a seal gap. The arrangement of the piston surfaces transversal to the longitudinal axis of the hydraulic valve facilitates a very compact configuration of the hydraulic valve and an advantageous actuation of the check valves. The two pressure cavities which are formed by the two piston surfaces are separated from each other by the seal gap which is obtained by the support of the first protrusion of the step piston so that the two pressure cavities are advantageously separately loadable with the hydraulic fluid.

According to an advantageous embodiment the step piston can include a seal edge on a radial outside of the second protrusion wherein the seal edge facilitates to open the second piston surface for loading with the hydraulic fluid through the supply connection. Thus, the seal edge of the second protrusion advantageously provides a control edge for the step piston which is arranged in a portion of an entry of the hydraulic valve through the supply connection. Thus, the second pressure cavity can be closed by the step piston towards the supply connection by a slight movement of the step piston in the longitudinal direction of the valve so that the second pressure cavity is loadable with the hydraulic fluid in a controlled manner. When the sealing edge passes over the opening of the supply connection both piston surfaces can become effective instantaneously so that the step piston can shift very quickly into the high pressure position of the hydraulic valve. The tank drains are closed during this time.

According to an advantageous configuration the seal gap can be formed between an inner bore hole wall of the first housing of the first check valve and an enveloping support surface of the first protrusion of the step piston. This way the first pressure cavity is reliably separated from the second pressure cavity and separately loadable with hydraulic fluid. Thus, the typical clearance of the two components in the seal gap only creates a minor leakage of the hydraulic fluid which is permissible for the intended function of the hydraulic valve.

According to an advantageous embodiment the first pressure cavity can be loadable with the hydraulic fluid through the supply connection in the low pressure position, whereas the second pressure cavity is open towards the tank drain. Thus, the active piston surface is only the first piston surface of the step piston. Hydraulic fluid can flow through the first operating connection in both directions. The second pressure cavity is closed towards the supply connection.

In an advantageous embodiment a connection can be opened by the sealing edge of the step piston between the second pressure cavity and the supply connection in the unstable transition range so that both piston surfaces are loaded with the hydraulic fluid and the tank drain is closed by the step piston. When the sealing edge passes over the opening of the supply connection both piston surfaces can become effective instantaneously so that the step piston can shift into the high pressure position of the hydraulic valve very quickly. Tank drains are closed during this process.

According to an advantageous embodiment the check valves can respectively include a plunger that is preloaded by a compression spring against a valve seat, wherein the compression springs are clamped between a spring plate arranged on the plunger on one side and a plunger support and/or the housing on the opposite side. Thus, the check valve is closed in the starting position since the plunger contacts the valve seat. Thus the plunger is pressed into the valve seat by the compression spring which is supported for the two springs at the spring plate which terminates the plunger on one side and which is supported on the opposite side for example at the first check valve at the plunger support and for the second check valve at the housing of the check valve.

According to an advantageous embodiment the compression springs can be arranged so that they envelop the plungers. This yields a symmetrical force impact of the compression springs at the plunger so that a risk that a plunger wedges during a movement in a longitudinal direction of the valve is reduced.

According to an advantageous embodiment the check valve scan be arranged opposite to each other on the longitudinal valve axis. An arrangement of this type is particularly advantageous because a step piston arranged there between can actuate both check valves in a simple manner since the step piston can be moved in both directions in a longitudinal direction of the valve by the spring preload and loading with the hydraulic fluid so that the check valves are effectively actuated.

According to an advantageous embodiment the first check valve can extend into an interior of the first protrusion and the divider wall can include a contact surface for the spring plate of the plunger. This yields a particularly compact configuration of the hydraulic valve. Furthermore this arrangement also implements short shift travels and thus advantageous shift times of the hydraulic valve. The contact surface for the spring plate facilitates a particularly reliable actuation of the check valve.

According to an advantageous embodiment the divider wall of the step piston can form a contact surface for the spring on its back side, wherein the plunger of the second check valve extends into an interior of the spring and the divider wall includes a contact surface for the spring plate of the plunger. Thus, the particularly compact configuration of the hydraulic valve can be improved even further. Furthermore this arrangement helps to implement short shifting paths and thus advantageous shifting times of the hydraulic valve. The contact surface for the spring plate facilitates a particularly reliable actuation of the check valve.

According to an advantageous embodiment the plungers are actuatable by the step piston in the axial direction so that plunger heads arranged at the plungers opposite to the spring plates are respectively liftable from their valve seats. This further improves the particularly compact configuration of the hydraulic valve. This arrangement implements short shift travels and thus advantageous shift times of the hydraulic valve. Actuating the check valves is also very advantageous with respect to force transfer since all movements of components involved are performed in a longitudinal direction.

According to an advantageous embodiment the plunger heads of the check valves can be configured cone shaped, wherein the plunger heads are applicable to the circular valve seat by the preloaded compression spring in order to achieve sealing. A configuration and arrangement of the involved sealing components is very advantageous for the sealing effect. In particular a configuration from metal materials provides a reliable and durable sealing effect.

According to an advantageous embodiment the first operating connection can be connectable through channels in the housing and the first check valve with the supply connection in the low pressure position. A supply of the hydraulic fluid to the first operating connection and thus to a support chamber of the connecting rod or from the operating connection to a bearing shell of the connecting rod can be implemented in this arrangement in a particularly compact and advantageous manner.

According to an advantageous embodiment the second operating connection can be connectable in the high pressure position through the second check valve and through channels in the second housing with the supply connection. A feeding of the hydraulic fluid to the second operating connection and thus to a support chamber of the connecting rod or from the operating connection to a bearing shell of the connecting rod can be implemented in this arrangement in a particularly compact and advantageous manner.

According to an advantageous embodiment the check valves can be respectively pressed into the valve housing as a pre mountable assembly. Thus fabrication of the entire hydraulic valve can be implemented in a particularly cost effective manner. Furthermore impressing provides a rather high level of reliability of the hydraulic valve.

Furthermore a connecting rod for a variable compression internal combustion engine is proposed. The connecting rod includes an eccentric element adjustment device for adjusting an effective connecting rod length wherein the eccentrical element adjustment device includes an eccentrical element cooperating with an eccentrical element lever and two pistons which are respectively movably supported in a hydraulic chamber and in which eccentrical element rods of the eccentrical element adjustment device which engage the eccentrical element lever are supported wherein an adjustment travel of the eccentrical element adjustment device is adjustable by a hydraulic valve. A connecting rod of this type can be configured particularly compact with the hydraulic valve according to the invention. Furthermore a cost effective fabrication of the connecting rod is provided with a high level of reliability of the shifting functions.

BRIEF DESCRIPTION OF THE DRAWINGS

Further advantages can be derived from the subsequent drawing description. The drawings illustrate an embodiment of the invention schematically. The drawings, the description and the patent claims include numerous features in combination. A person skilled in the art will advantageously view the features individually and will combine them into useful additional combinations, wherein:

FIG. 3-8 illustrate various sectional views of the hydraulic valve in a stable low pressure position;

FIGS. 10-15 illustrate various sectional views of the hydraulic valve in the high pressure position;

DETAILED DESCRIPTION OF THE INVENTION

In the drawing figures identical or equivalent components are designated with identical reference numerals. The figures only illustrate exemplary embodiments and do not limit the scope and spirit of the invention.

Figure 1:
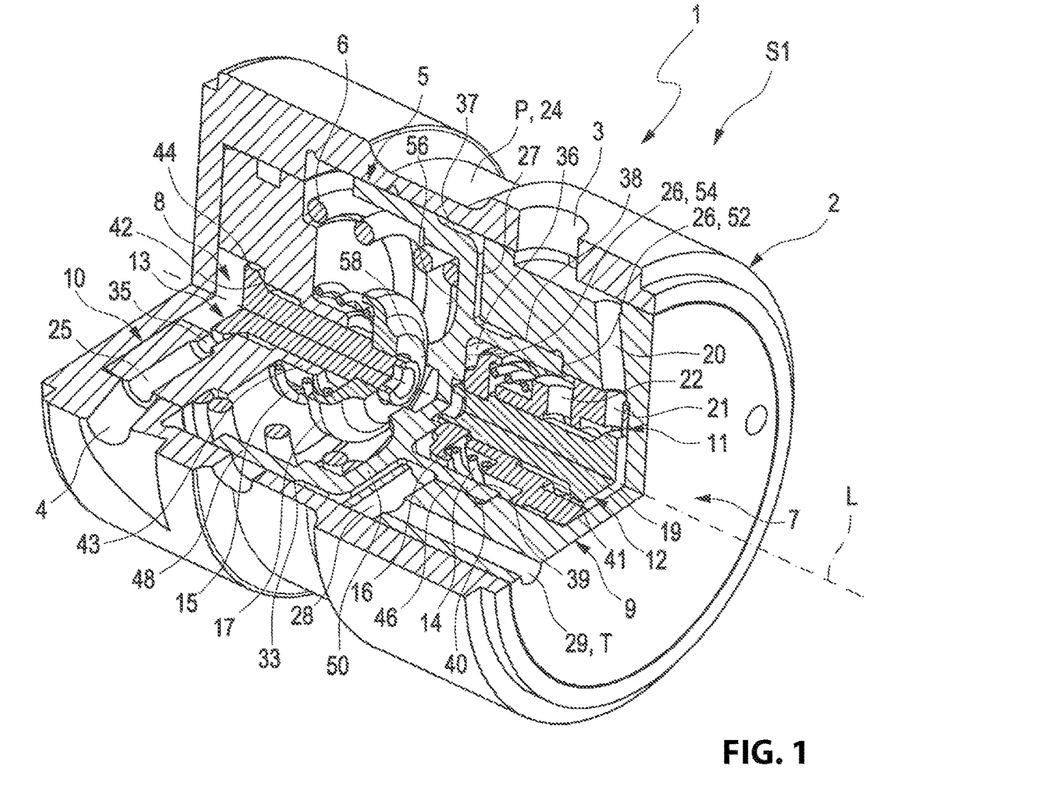
FIG. 1 illustrates a hydraulic valve according to the invention in an isometric partial sectional view.
Figure 17:
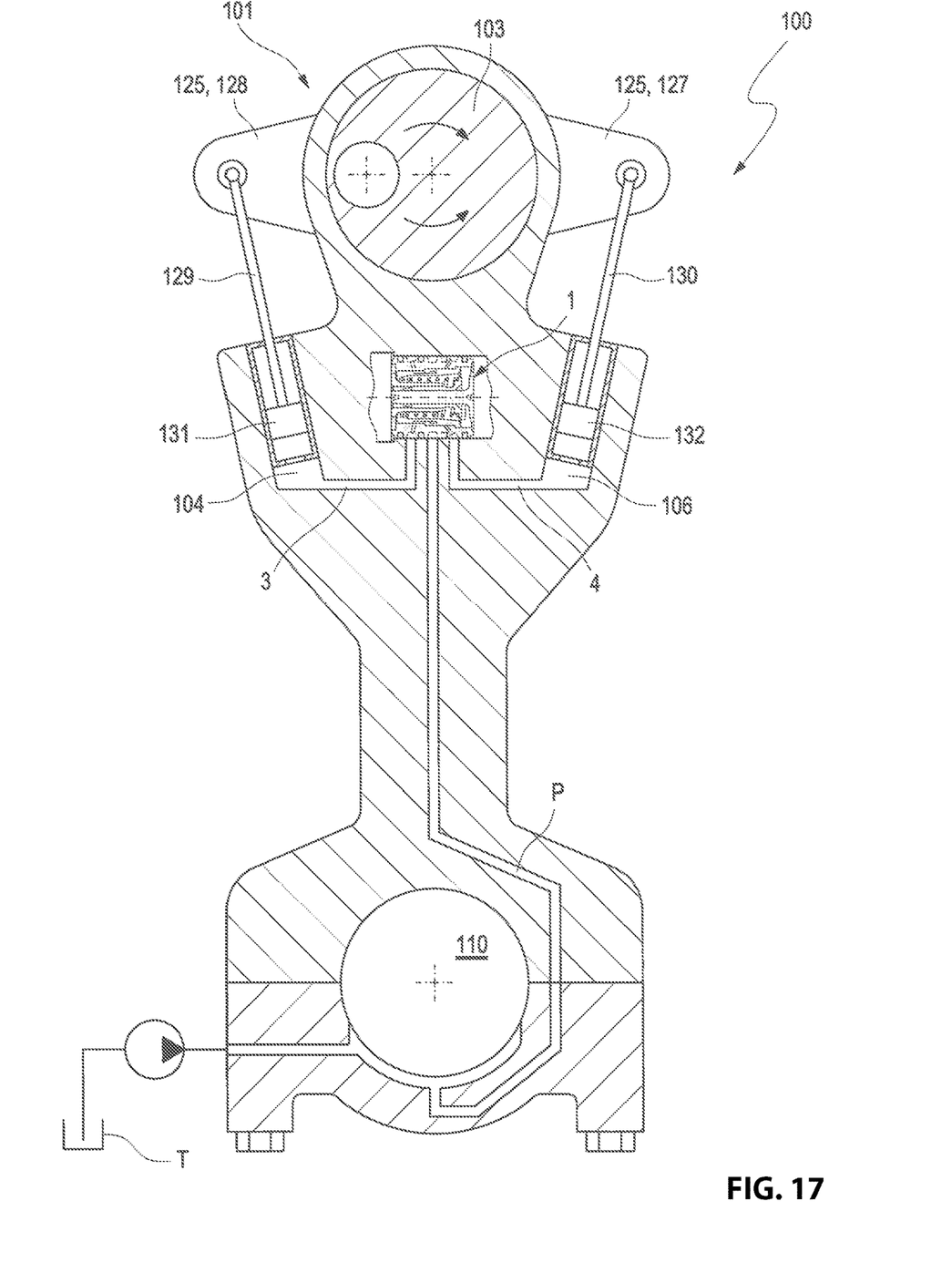
FIG. 17 illustrates a cross sectional view of a connecting rod with a hydraulic valve.

FIG. 1 illustrates a hydraulic valve 1 according to invention in a perspective and partial sectional view, wherein the hydraulic valve is provided for example for shifting a control piston in a connecting rod 100 illustrated in FIG. 17 for a variable compression internal combustion engine.

The hydraulic valve 1 includes a valve housing 2 and a first operating connection 3, a second operating connection 4 and a supply connection P that is loadable with a hydraulic pressure of a hydraulic fluid. The hydraulic pressure of the hydraulic fluid displaces a movable step piston 5 that is arranged in the valve housing 2 against a force of a preloaded spring 6, wherein the step piston 5 remains in a stable low pressure position in a low pressure range due to the preload of the spring 6 wherein the supply connection P is connectable with the first operating connection 3 in the stable low pressure position and the step piston 5 is arranged in a high pressure range in a stable high pressure position in which the second operating connection 4 is connectable with the supply connection P.

An unstable transition portion is provided between the two pressure ranges wherein the displacement of the step piston from the stable low pressure position to the stable high pressure position is performed at a higher pressure than the movement from the stable high pressure position to the stable low pressure position. Thus, the operating connections 3 and 4 can be connected with the supply connection P as long as possible.

A first check valve 7 is associated with the first operating connection 3 according to the invention and a second check valve 8 is associated with the second operating connection 4, wherein the check valves 7, 8 open or close a connection of the first operating connection 3 or the second operating connection 4 with the supply connection P as a function of the step piston 5. The check valves 7, 8 are thus arranged opposite to one another on the longitudinal valve axis L.

The check valves 7, 8 are provided integrated in the valve housing 2. Therefore the check valves are advantageously respectively pressed into the valve housing 2 as a preassembled module.

The step piston 5 is provided hollow cylindrical in portions, wherein a first hollow cylindrical protrusion 46 extends from a divider wall 50 in one direction and a second hollow cylindrical protrusion 48 extends from the divider wall 50 in an opposite direction with respect to a longitudinal valve axis L. The first protrusion 46 has a smaller radius than the second protrusion 48. A first piston surface 26 is formed by a cross section 30 of the first protrusion 46. A second piston surface 27 is formed in portions by the divider wall 50 and envelops the first protrusion 46 as an annular disc. The spring 6 is received in the second protrusion 48. The piston surfaces 26, 27 are arranged transversal to the longitudinal valve axis L. The radially inner first piston surface 26 defines a first pressure cavity 36 and the radially outer piston surface 27 defines a second pressure cavity 37, wherein the two pressure cavities 36, 37 are separated from each other by a seal gap 38. The seal gap 38 is formed between an inner bore hole wall 39 of a first housing 9 of the first check valve 7 and an enveloping support surface 40 of the first protrusion 46 of the step piston 5. The step piston 5 includes a seal edge 33 on a radial outside of the second protrusion 48 wherein the second piston surface 27 is openable by the seal edge 33 through the supply connection P for a loading with the hydraulic fluid.

As evident from FIG. 1 the two check valves 7, 8 respectively include a housing 9, 10 which is for example pressed into the valve housing 2. Furthermore the two check valves 7, 8 respectively include a plunger 12, 13 that is preloaded by a compression spring 14, 15 against a valve seat. The support of the plunger 12 of the first check valve 7 is thus provided by a plunger support 11 which is pressed into the housing 9 of the first check valve 7. The support of the other plunger 13 of the second check valve 8 is thus provided by a bore hole configured as plunger support 43 and directly provided in the housing 10 of the second check valve 8.

The compression spring 14, 15 which is supported at the housing 10 or the plunger support 11 is respectively preloaded by a spring plate 16, 17 which is secured on the plunger 12, 13 for example by a flanging. The compression springs 14, 15 are arranged so that they envelop the plungers 12, 13.

The first check valve 7 extends into an interior of the first protrusion 46. The divider wall 50 includes a contact surface 54 for the spring plate 16 of the plunger 12. The divider wall 50 of the step piston 5 forms a contact surface 56 for the spring 6 on a backside of the divider wall 50, wherein the plunger 13 of the second check valve 8 extends into an interior of the spring 6. The divider wall 50 thus includes a contact surface 58 for the spring plate 17 of the plunger 13.

The plungers 12, 13 are actuatable by the step piston 5 in an axial direction so that plunger heads 19, 44 arranged at the plungers 12, 13 opposite to the spring plates 16, 17 are respectively liftable from their valve seats 41, 42. The plunger heads 19, 44 of the check valves 7, 8 are configured cone shaped and are applicable to the circular valve seat 41, 42 by the preloaded compression spring 14, 15 for sealing purposes.

The function of the hydraulic valve 1 with the check valve 7, 8 is described infra.

Figure 2:
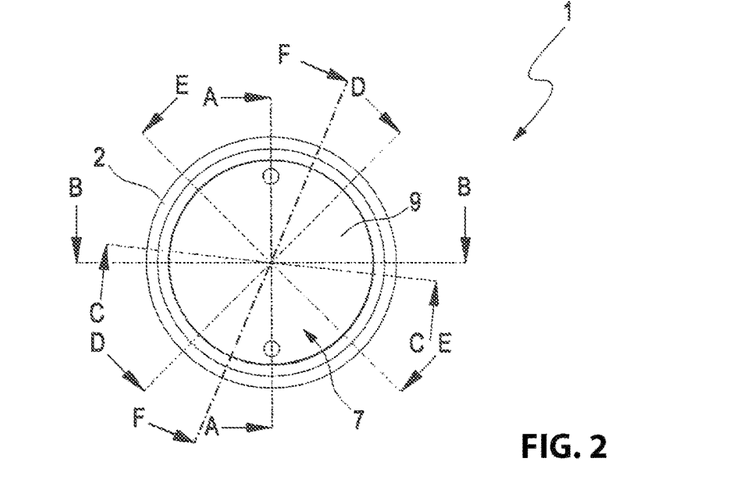
FIG. 2 illustrates a side view of the hydraulic valve according to FIG. 1 with plural section planes.

FIG. 2 illustrates a side view of the hydraulic valve 1 with different sectional planes. FIGS. 3-15 include sectional views of the hydraulic valve 1 in various switching positions.

Figure 3:
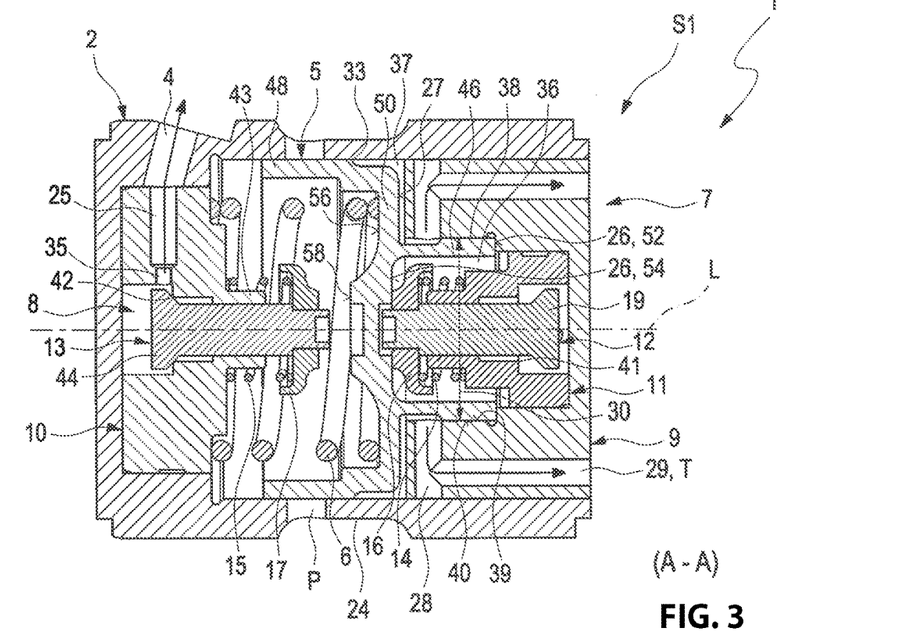
FIG. 3 illustrates a first longitudinal sectional view of the hydraulic valve of FIG. 1 in the low pressure position along the line A-A in FIG. 2.
Figure 4:
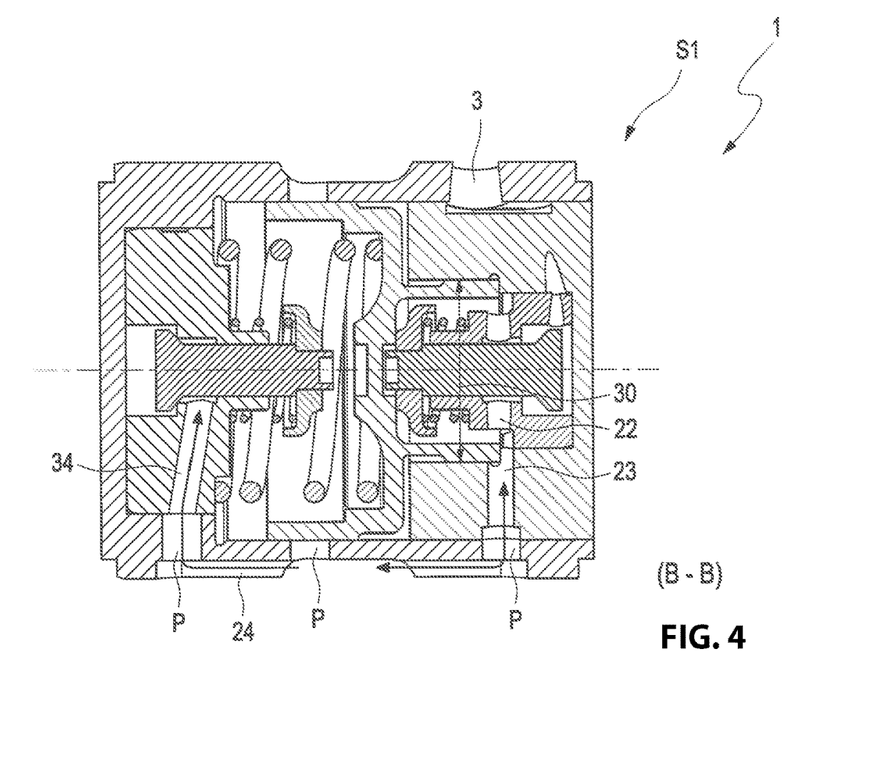
FIG. 4 illustrates a second longitudinal sectional view of the hydraulic valve of FIG. 1 in the low pressure position along the line B-B in FIG. 2.
Figure 5:
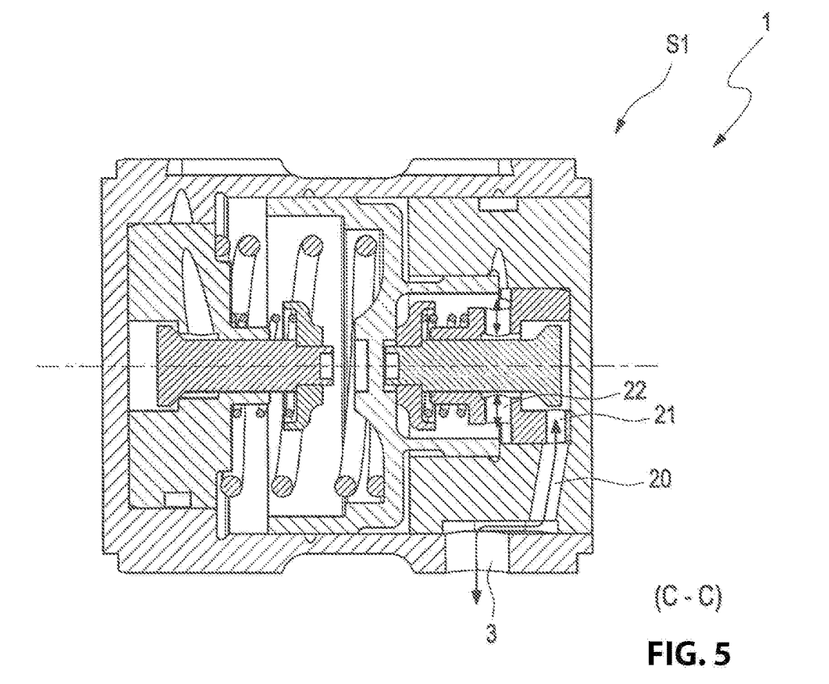
FIG. 5 illustrates a third longitudinal sectional view of the hydraulic valve of FIG. 1 in the low pressure position along the line C-C in FIG. 2.
Figure 6:
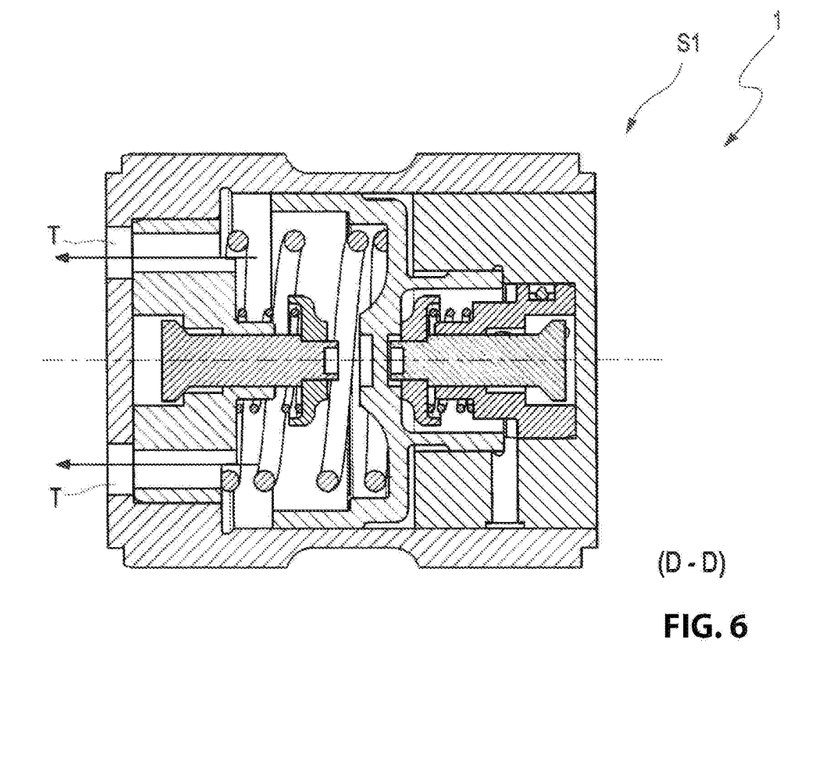
FIG. 6 illustrates a fourth longitudinal sectional view of the hydraulic valve of FIG. 1 in the low pressure position along the line D-D in FIG. 2.

FIGS. 3-8 illustrate sectional views of the hydraulic valve 1 in the stable low pressure position in which the first operating connection 3 is connected with the supply connection P. It is evident that the step piston 5 is supported in the right position in the drawing by the spring force of the spring 6 so that the step piston 5 actuates the plunger 12 of the first check valve 7 against the force of the compression spring 14 and lifts the plunger head 19 from its valve seat 41 at the plunger support 11. Thus, the first operating connection 3 is connected with the supply connection P through the channels 20, 21 visible in FIG. 5 in the housing 9 and the plunger support 11, the check valve 7 and by channels 22, 23 as illustrated in FIG. 4 in the housing 9 and in the plunger support 11 wherein the supply connection P is provided by a circumferential groove 24 and plural transversal bore holes in the valve housing 2 as evident from FIG. 4 and in particular from FIG. 16.

In the low pressure position S1 the first check valve 7 is arranged so that a connection from the supply connection P to the first operating connection 3 is opened. The second check valve 8 is thus arranged so that a connection from the supply connection P to the second operating connection 4 is blocked. In the low pressure position S1 the first pressure cavity 36 is loadable with the hydraulic fluid through the supply connection P, whereas the second pressure cavity 37 is opened towards the tank drain T.

In this low pressure position S1 the so called gas force side (GKS) can suction hydraulic fluid through the second operating connection 4 and a channel 25 from a bearing shell of the connecting rod 100. The connection of the second operating connection 4 to the supply connection P, however, is blocked by the closed check valve 8.

The so called mass force side (MKS) is connected with the supply connection P through the first operating connection 3 as described supra and hydraulic fluid can be suctioned in in a throttled manner, but the hydraulic fluid can also flow back into the bearing shell.

A large second piston surface 27 of the step piston 5 is furthermore unloaded through the channels 28, 29 of the housing 9 towards a tank T and lets leakage fluid drain as further evident from FIG. 3. The active first piston surface 26 is the small diameter 30 of the step piston 5 illustrated in FIG. 4.

Figure 7:
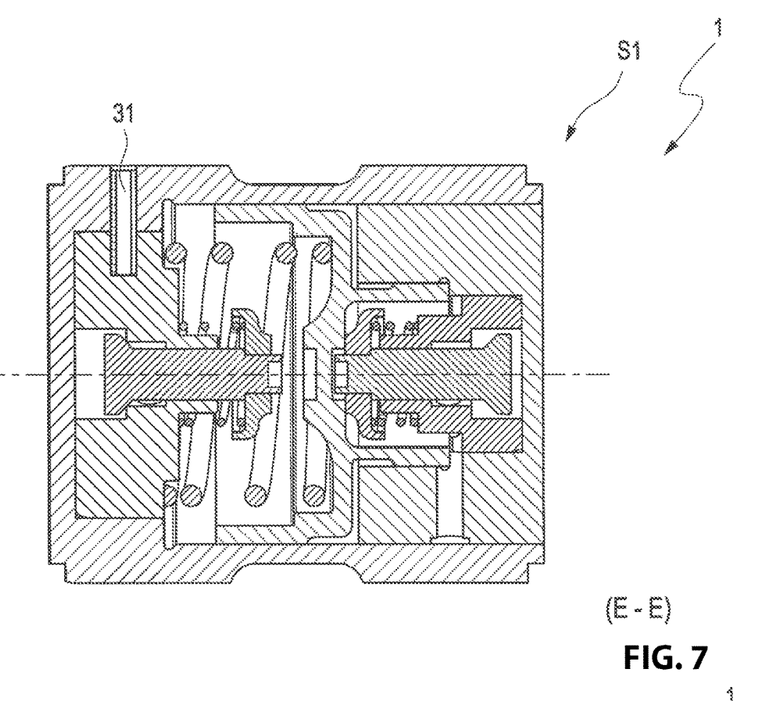
FIG. 7 illustrates a fifth longitudinal sectional view through the hydraulic valve of FIG. 1 in the low pressure position along the line E-E in FIG. 2.
Figure 8:
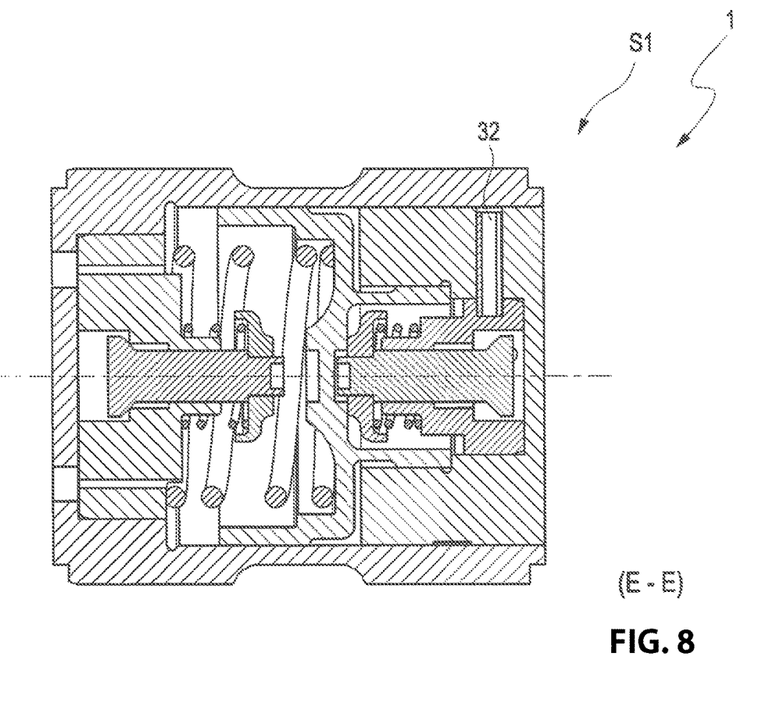
FIG. 8 illustrates a sixth longitudinal sectional view through the hydraulic valve of FIG. 1 in the low pressure position along the line F-F in FIG. 2.

FIGS. 7 and 8 furthermore illustrate impressed clamping pins 31, 32 which secure the positioning of the check valve 7, 8 by form locking.

Figure 9:
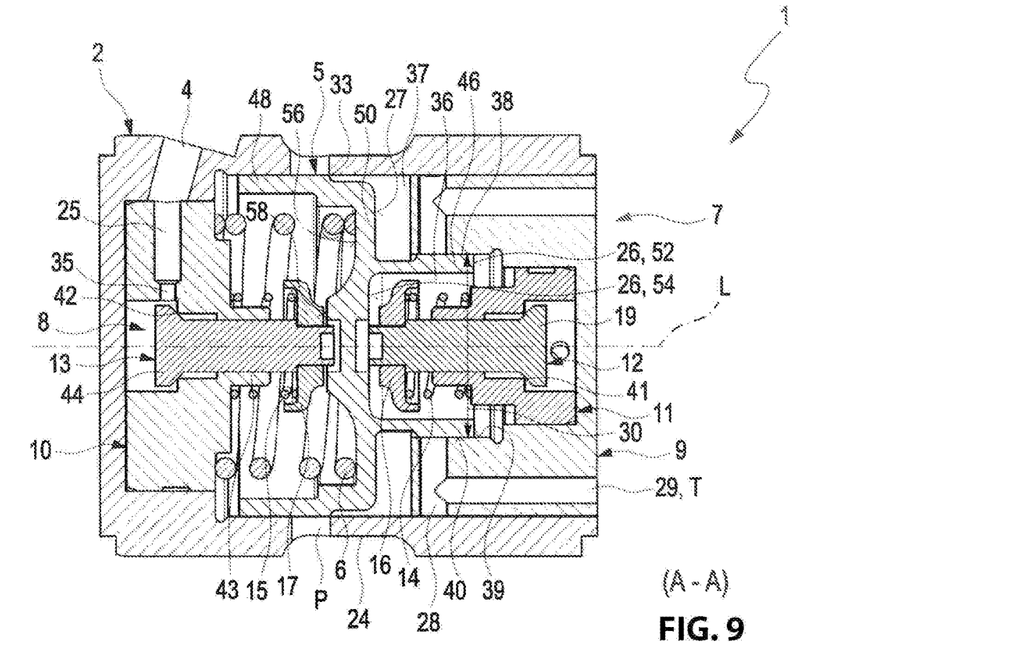
FIG. 9 illustrates a longitudinal sectional view through the hydraulic valve of FIG. 1 during a shifting process in a transition state.
Figure 10:
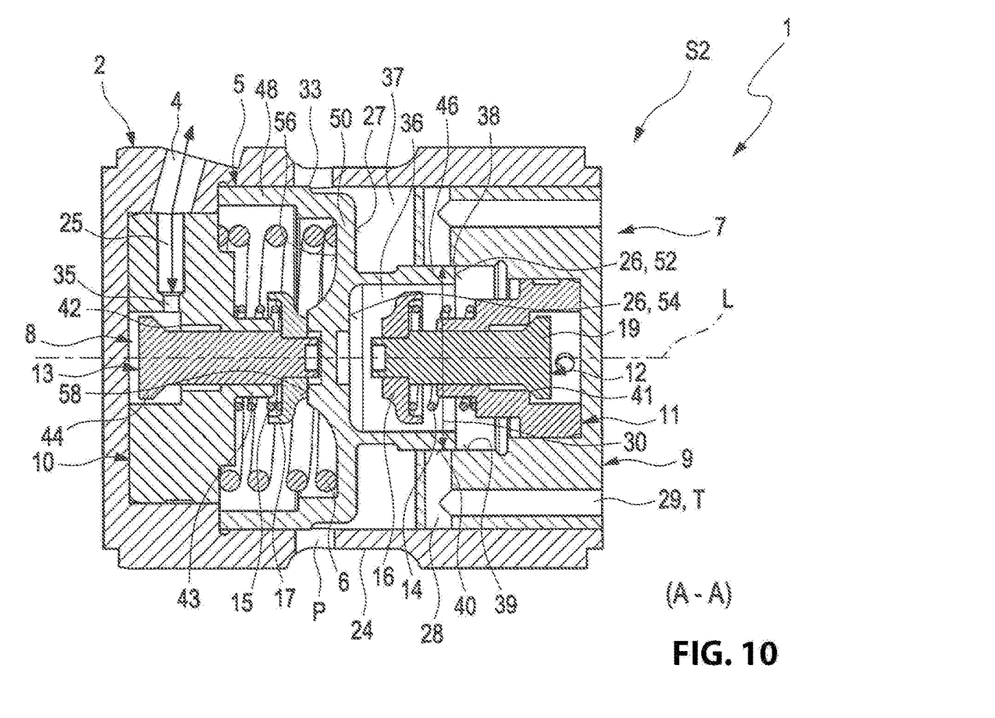
FIG. 10 illustrates a first longitudinal sectional view of the hydraulic valve according to FIG. 1 in the high pressure position along the line A-A in FIG. 2.
Figure 11:
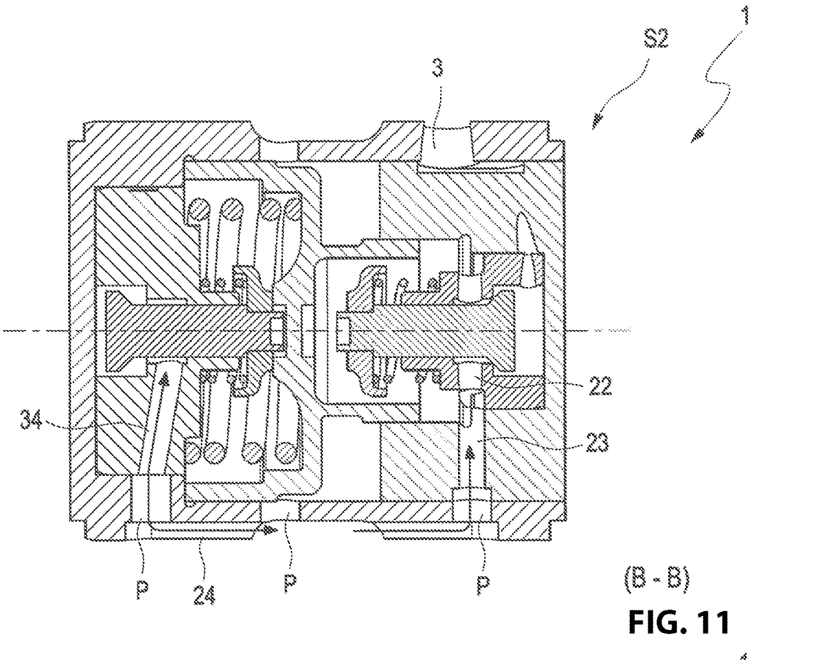
FIG. 11 illustrates a second longitudinal sectional view of the hydraulic valve according to FIG. 1 in the high pressure position along the line B-B in FIG. 2.
Figure 12:
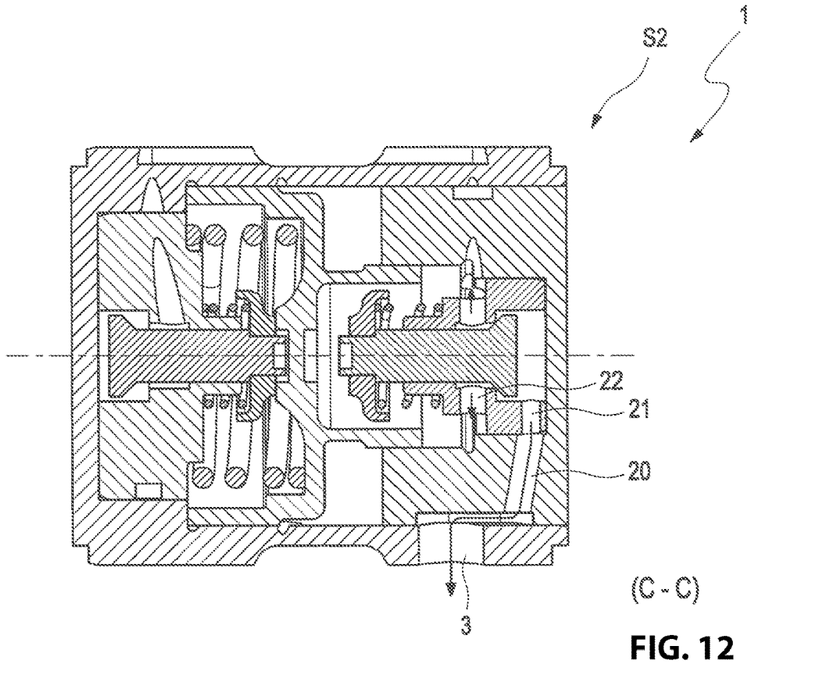
FIG. 12 illustrates a third longitudinal sectional view through the hydraulic valve according to FIG. 1 in the high pressure position along the line C-C in FIG. 2.
Figure 13:
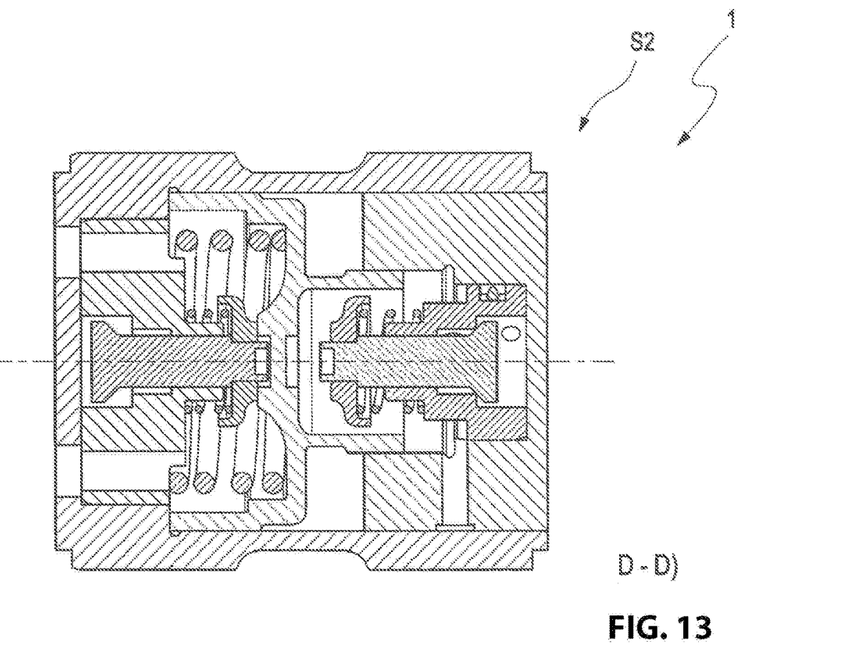
FIG. 13 illustrates a fourth longitudinal sectional view of the hydraulic valve of FIG. 1 in the high pressure position along the line D-D in FIG. 2.
Figure 14:
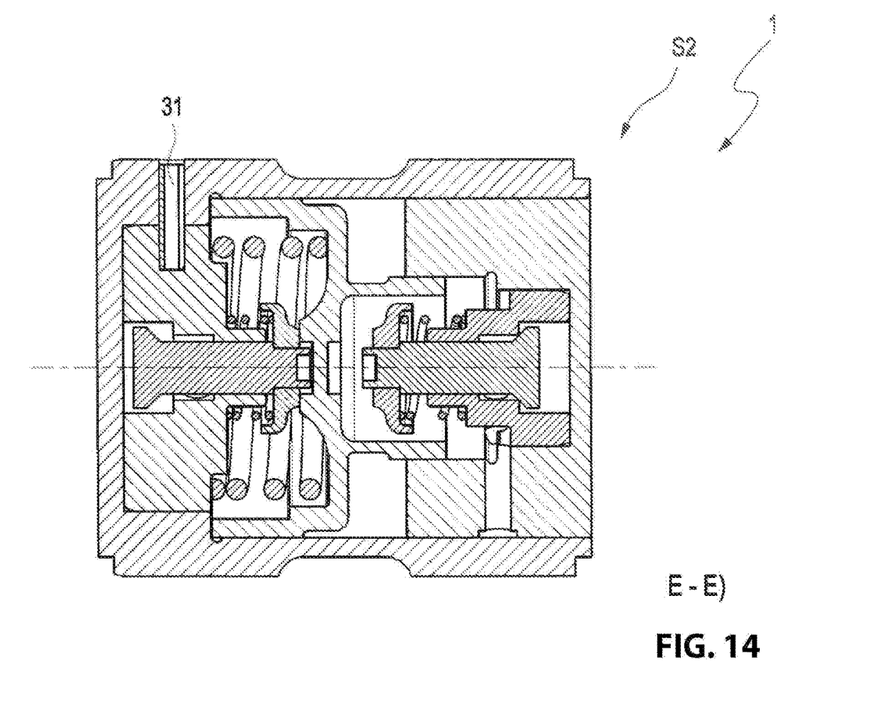
FIG. 14 illustrates a fifth longitudinal sectional view of the hydraulic valve according to FIG. 1 in the high pressure position along the line E-E in FIG. 2.
Figure 15:
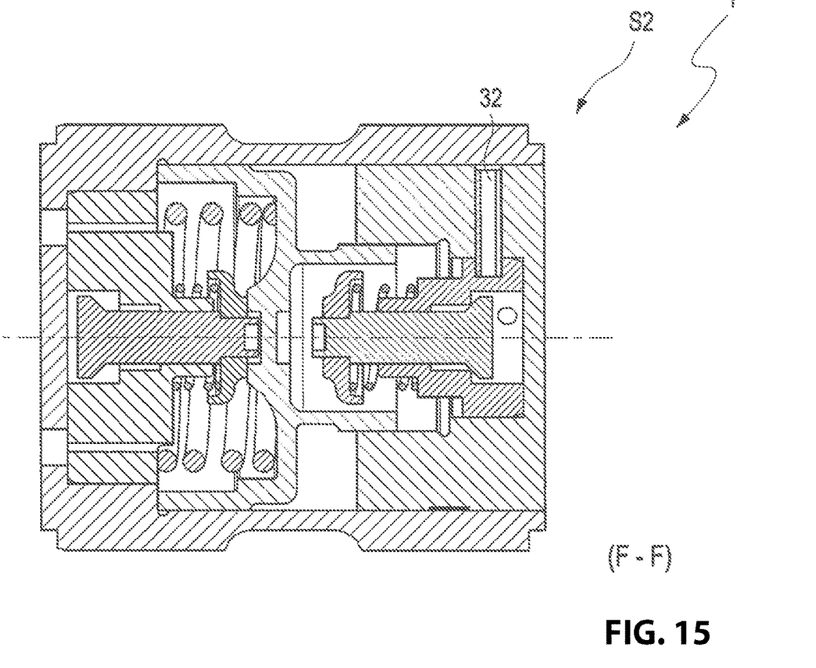
FIG. 15 illustrates a sixth longitudinal sectional view of the hydraulic valve of FIG. 1 in the high pressure position along the line F-F in FIG. 2.

FIG. 9 illustrates the hydraulic valve 1 during a shifting process in a transition state. It is evident that as soon as a sealing edge 33 of the step piston 5 moves into a portion of the transversal bore hole of the supply connection P the large second piston surface 27 is effective in addition to the first piston surface 26 with the small diameter 30. The tank unloading channels 28, 29 are closed by the step piston 5, thus the step piston 5 moves into the second switching position, the high pressure position S2 which is illustrated in FIGS. 10-15.

In the high pressure position S2 the first check valve 7 is arranged so that a connection from the supply connection P to the first operating connection 3 is blocked. The second check valve 8 is thus arranged so that a connection from the supply connection P to the second operating connection 4 is released.

It is evident in this high pressure position S2 that the second operating connection 4 is connected with the supply connection P through the check valve 8 opened by the step piston 5 and through the channels 25 and 34 in the housing 10. The hydraulic flow is thus limited by a defined throttle or aperture 35 so that the hydraulic fluid flows from the GKS—chamber back to the supply connection P. On the other hand side hydraulic fluid can be suctioned in a throttled manner in a direction towards the first operating connection 3 through the closed first check valve 7, but the hydraulic fluid cannot drain. In this position both diameters or piston surfaces 27, 30 are effective.

Check valves arranged so far in the connecting rod can be omitted due to the hydraulic valve 1 according to the invention and the hydraulic valve 1 only requires a supply connection P—bore hole from the bearing shell, wherein the adjustment speed of the connecting rod 100 is limited by the throttle cross sections.

By the same token a leakage from the cavities can be precluded since the check valves 7, 8 facilitate a metal sealing.

The hydraulic valve 1 according to the invention furthermore facilitates a greater clearance between the step piston 5 and the valve housing 2, so that the hydraulic valve 1 can be pressed in to the connecting rod and deformations of the valve housing 2 do not lead to a binding of the piston. Valve seals can thus be omitted.

Therefore the hydraulic valve 1 as well as the piston can be produced in a more cost effective manner.

Figure 16:
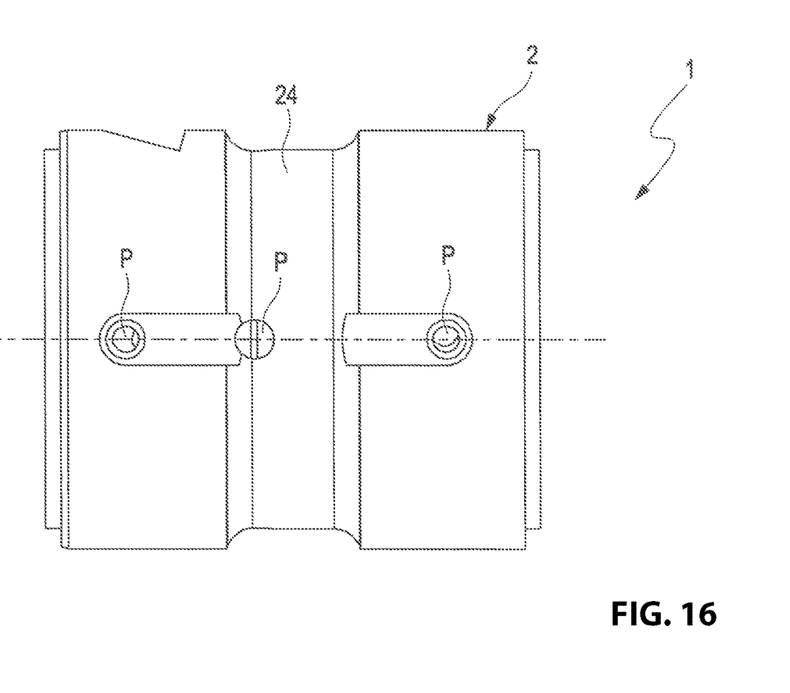
FIG. 16 illustrates a side view of the hydraulic valve according to FIG. 1.

FIG. 16 illustrates a side view of the hydraulic valve 1 in which in particular the groove 24 of the supply connection P is illustrated wherein the supply connection P is run through bore holes into an interior of the hydraulic valve 1.

FIG. 17 illustrates a cross section through a connecting rod 100 with a hydraulic valve 1 according to an embodiment of the invention. The connecting rod 100 includes the hydraulic valve 1 with channels for supplying the hydraulic valve 1 with hydraulic fluid and is thus provided in particular for switching a shifting piston 131, 132 in the connecting rod 100 for a variable compression of an internal combustion engine. The connecting rod 100 includes an eccentrical element adjustment device 101 for adjusting an effective connecting rod length, wherein the eccentrical element adjustment device 101 includes an eccentrical element 103 that cooperates with the eccentrical element lever 125. Furthermore the eccentrical element adjustment device 101 includes two pistons 131, 132 which are respectively movably supported in a hydraulic chamber 104, 106 and wherein two eccentrical element rods of the eccentrical element adjustment device 101 engaging two opposite arms 127, 128 of the eccentrical element lever 125 are supported at the two pistons 131, 132. Thus, an adjustment travel of the eccentrical element adjustment device 101 is adjustable by a hydraulic valve 1. The hydraulic valve 1 is connected with the hydraulic chambers 104, 106 through the operating connections 3, 4 wherein the hydraulic chambers 104, 106 represent the GKS chamber or the MKS chamber in which two pistons 131, 132 are operated which adjust the eccentrical element 103. Through the supply connection P the hydraulic valve 1 is connected with the bearing shell 110 of the connecting rod 100, which is in turn supplied by a feed pump with hydraulic fluid. The tank drain from the hydraulic valve 1 for connecting with the tank T is not illustrated in FIG. 17.

What is claimed is:

1. A hydraulic valve for shifting a control piston in a connecting rod of an internal combustion engine with variable compression, the hydraulic valve comprising:
   a valve housing including a first operating connection, a second operating connection and a supply connection that is loadable with a hydraulic pressure of a hydraulic fluid; and
   a step piston that is arranged in the valve housing and displaceable by the hydraulic pressure of the hydraulic fluid against a force of a preloaded spring,
   wherein the step piston remains in a stable low pressure position in a first low pressure range due to a preload of the spring wherein the supply connection is connectable with the first operating connection in the stable low pressure position,
   wherein the step piston is in a stable high pressure position in a second high pressure range and wherein the second operating connection is connectable with the supply connection in the stable high pressure position,
   wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position,
   wherein a first check valve is associated with the first operating connection and a second check valve is associated with the second operating connection,
   wherein the first check valve and the second check valve open or close a connection of the first operating connection or the second operating connection with the supply connection as a function of a position of the step piston,
   wherein the first check valve and the second check valve are integrated into the valve housing,
   wherein the first operating connection is connectable through channels in the first housing and the first check valve with the supply connection in the low pressure position of the step piston, and
   wherein the second operating connection is connectable through the second check valve and through channels in the second housing with the supply connection in the high pressure position of the step piston.

2. The hydraulic valve according to claim 1,
   wherein the first check valve is arranged in the low pressure position of the step piston so that a connection from the supply connection to the first operating connection is open,
   wherein the second check valve is arranged so that a connection from the supply connection to the second operating connection is closed,
   wherein the first check valve is arranged in the high pressure position of the step piston so that a connection from the supply connection to the first operating connection is closed, and
   wherein the second check valve is arranged so that a connection from the supply connection to the second operating connection is open.

3. The hydraulic valve according to claim 1,
   wherein the step piston is provided hollow cylindrical at least in portions,
   wherein a first hollow cylindrical protrusion extends from a divider wall in one direction and a second hollow cylindrical protrusion extends from the divider wall in an opposite direction with respect to a valve longitudinal axis,
   wherein the first protrusion has a smaller diameter than the second protrusion,
   wherein a first piston surface is formed by cross section of the first protrusion and a second piston surface is formed at least in portions by the divider wall and envelops the first protrusion as an annular disc, and
   wherein the spring is received in the second protrusion.

4. The hydraulic valve according to claim 3,
   wherein the first piston surface and the second piston surface are oriented transversal to the valve longitudinal axis,
   wherein a radially inner first piston surface defines a first pressure cavity and a radially outer second piston surface defines a second pressure cavity, and
   wherein the first pressure cavity and the second pressure cavity are separated from each other by a seal gap.

5. The hydraulic valve according to claim 3,
   wherein the step piston includes a seal edge on a radial outside of the second protrusion, and wherein the second piston surface is openable by the seal edge for a loading with the hydraulic fluid through the supply connection.

6. The hydraulic valve according to claim 4,
wherein the seal gap is formed between an inner bore hole wall of a first housing of the first check valve and an enveloping support surface of the first protrusion of the step piston.

7. The hydraulic valve according to claim 4,
wherein the first pressure cavity is loadable with the hydraulic fluid through the supply connection in the low pressure position of the step piston, and
wherein the second pressure cavity is open towards a tank drain.

8. The hydraulic valve according to claim 1,
wherein a connection between a second pressure cavity and the supply connection is opened by a seal edge of the step piston in an unstable transition range so that a first piston surface and a second piston surface is loaded by the hydraulic fluid, and
wherein a tank drain is closed by the step piston.

9. The hydraulic valve according to claim 1,
wherein the first check valve includes a first plunger preloaded by a first compression spring against a first valve seat,
wherein the second check valve includes a second plunger preloaded by a second compression spring against a second valve seat,
wherein the first compression spring is clamped between a first spring plate arranged on the first plunger on a first side and a plunger support or the housing on an opposite second side, and
wherein the second compression spring is clamped between a second spring plate arranged on the second plunger on a third side and a plunger support or the housing on an opposite fourth side.

10. The hydraulic valve according to claim 9,
wherein the first compression spring envelops the first plunger, and
wherein the second compression spring envelops the second plunger.

11. The hydraulic valve according to claim 1, wherein the first check valve and the second check valve are arranged opposite to one another on a valve longitudinal axis.

12. The hydraulic valve according to claim 9,
wherein the first check valve extends into an interior of the first protrusion and a divider wall includes a contact surface for the first spring plate of the first plunger.

13. The hydraulic valve according to claim 9,
wherein a divider wall of the step piston forms a contact surface for the spring on a back side of the divider wall, and
wherein the second plunger of the second check valve extends into an interior of the spring and the divider wall includes a contact surface for the second spring plate of the second plunger of the second check valve.

14. The hydraulic valve according to claim 9,
wherein the first and second plungers are actuatable by the step piston in an axial direction so that the first and second plunger heads that are arranged at the first and second plungers opposite to the first and second spring plates are liftable from the first and second valve seats of the first and second plunger heads.

15. The hydraulic valve according to claim 14,
wherein the first and second plunger heads of the first check valve and the second check valve are configured cone shaped,
wherein the first and second plunger heads are applicable by the preloaded compression spring to seal the circular first and second valve seats.

16. The hydraulic valve according to claim 1, wherein the first check valve and the second check valve are respectively pressed into the valve housing as preassembled modules.

17. A connecting rod for an internal combustion engine with variable compression, the connecting rod comprising:
an eccentrical element adjustment device for adjusting an effective connecting rod length, the eccentrical element adjustment device including
an eccentrical element that cooperates with an eccentrical element lever;
two pistons that are supported and displaceable in a respective hydraulic chamber,
wherein eccentrical element rods of the eccentrical element adjustment device engaging the eccentrical element adjustment lever are supported at the two pistons, and
wherein an adjustment travel of the eccentrical element adjustment device is adjustable by a hydraulic valve according to claim 1.

18. A hydraulic valve for shifting a control piston in a connecting rod of an internal combustion engine with variable compression, the hydraulic valve comprising:
a valve housing including a first operating connection, a second operating connection and a supply connection that is loadable with a hydraulic pressure of a hydraulic fluid; and
a step piston that is arranged in the valve housing and displaceable by the hydraulic pressure of the hydraulic fluid against a force of a preloaded spring,
wherein the step piston remains in a stable low pressure position in a first low pressure range due to a preload of the spring wherein the supply connection is connectable with the first operating connection in the stable low pressure position,
wherein the step piston is in a stable high pressure position in a second high pressure range and wherein the second operating connection is connectable with the supply connection in the stable high pressure position,
wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position,
wherein a first check valve is associated with the first operating connection and a second check valve is associated with the second operating connection,
wherein the first check valve and the second check valve open or close a connection of the first operating connection or the second operating connection with the supply connection as a function of a position of the step piston,
wherein the first check valve and the second check valve are integrated into the valve housing,
wherein the step piston is provided hollow cylindrical at least in portions,
wherein a first hollow cylindrical protrusion extends from a divider wall in one direction and a second hollow cylindrical protrusion extends from the divider wall in an opposite direction with respect to a valve longitudinal axis,
wherein the first protrusion has a smaller diameter than the second protrusion, wherein a first piston surface is formed by cross section of the first protrusion and a second piston surface is formed at least in portions by the divider wall and envelops the first protrusion as an annular disc, wherein the spring is received in the second protrusion, wherein the first piston surface and the second piston surface are oriented transversal to the valve longitudinal axis, wherein a radially inner first piston surface defines a first pressure cavity and a radially outer second piston surface defines a second pressure cavity, wherein the first pressure cavity and the second pressure cavity are separated from each other by a seal gap, and wherein the seal gap is formed between an inner bore hole wall of a first housing of the first check valve and an enveloping support surface of the first protrusion of the step piston.

19. A hydraulic valve for shifting a control piston in a connecting rod of an internal combustion engine with variable compression, the hydraulic valve comprising:

a valve housing including a first operating connection, a second operating connection and a supply connection that is loadable with a hydraulic pressure of a hydraulic fluid; and a step piston that is arranged in the valve housing and displaceable by the hydraulic pressure of the hydraulic fluid against a force of a preloaded spring, wherein the step piston remains in a stable low pressure position in a first low pressure range due to a preload of the spring wherein the supply connection is connectable with the first operating connection in the stable low pressure position, wherein the step piston is in a stable high pressure position in a second high pressure range and wherein the second operating connection is connectable with the supply connection in the stable high pressure position, wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position, wherein a first check valve is associated with the first operating connection and a second check valve is associated with the second operating connection, wherein the first check valve and the second check valve open or close a connection of the first operating connection or the second operating connection with the supply connection as a function of a position of the step piston, wherein the first check valve and the second check valve are integrated into the valve housing, wherein a connection between a second pressure cavity and the supply connection is opened by a seal edge of the step piston in an unstable transition range so that a first piston surface and a second piston surface is loaded by the hydraulic fluid, and wherein a tank drain is closed by the step piston.

20. A hydraulic valve for shifting a control piston in a connecting rod of an internal combustion engine with variable compression, the hydraulic valve comprising:

a valve housing including a first operating connection, a second operating connection and a supply connection that is loadable with a hydraulic pressure of a hydraulic fluid; and a step piston that is arranged in the valve housing and displaceable by the hydraulic pressure of the hydraulic fluid against a force of a preloaded spring, wherein the step piston remains in a stable low pressure position in a first low pressure range due to a preload of the spring wherein the supply connection is connectable with the first operating connection in the stable low pressure position, wherein the step piston is in a stable high pressure position in a second high pressure range and wherein the second operating connection is connectable with the supply connection in the stable high pressure position, wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position, wherein a first check valve is associated with the first operating connection and a second check valve is associated with the second operating connection, wherein the first check valve and the second check valve open or close a connection of the first operating connection or the second operating connection with the supply connection as a function of a position of the step piston, wherein the first check valve and the second check valve are integrated into the valve housing, wherein the first check valve includes a first plunger preloaded by a first compression spring against a first valve seat, wherein the second check valve includes a second plunger preloaded by a second compression spring against a second valve seat, wherein the first compression spring is clamped between a first spring plate arranged on the first plunger on a first side and a plunger support or the housing on an opposite second side, wherein the second compression spring is clamped between a second spring plate arranged on the second plunger on a third side and a plunger support or the housing on an opposite fourth side, and wherein the first check valve extends into an interior of the first protrusion and a divider wall includes a contact surface for the first spring plate of the first plunger.

21. A hydraulic valve for shifting a control piston in a connecting rod of an internal combustion engine with variable compression, the hydraulic valve comprising:

a valve housing including a first operating connection, a second operating connection and a supply connection that is loadable with a hydraulic pressure of a hydraulic fluid; and a step piston that is arranged in the valve housing and displaceable by the hydraulic pressure of the hydraulic fluid against a force of a preloaded spring, wherein the step piston remains in a stable low pressure position in a first low pressure range due to a preload of the spring wherein the supply connection is connectable with the first operating connection in the stable low pressure position, wherein the step piston is in a stable high pressure position in a second high pressure range and wherein the second operating connection is connectable with the supply connection in the stable high pressure position, wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position, wherein a first check valve is associated with the first operating connection and a second check valve is associated with the second operating connection, wherein the first check valve and the second check valve open or close a connection of the first operating connection or the second operating connection with the supply connection as a function of a position of the step piston, wherein the first check valve and the second check valve are integrated into the valve housing, wherein the first check valve includes a first plunger preloaded by a first compression spring against a first valve seat, wherein the second check valve includes a second plunger preloaded by a second compression spring against a second valve seat, wherein the first compression spring is clamped between a first spring plate arranged on the first plunger on a first side and a plunger support or the housing on an opposite second side, wherein the second compression spring is clamped between a second spring plate arranged on the second plunger on a third side and a plunger support or the housing on an opposite fourth side, wherein a divider wall of the step piston forms a contact surface for the spring on a back side of the divider wall, and wherein the second plunger of the second check valve extends into an interior of the spring and the divider wall includes a contact surface for the second spring plate of the second plunger of the second check valve.

22. A hydraulic valve for shifting a control piston in a connecting rod of an internal combustion engine with variable compression, the hydraulic valve comprising:

a valve housing including a first operating connection, a second operating connection and a supply connection that is loadable with a hydraulic pressure of a hydraulic fluid; and a step piston that is arranged in the valve housing and displaceable by the hydraulic pressure of the hydraulic fluid against a force of a preloaded spring, wherein the step piston remains in a stable low pressure position in a first low pressure range due to a preload of the spring wherein the supply connection is connectable with the first operating connection in the stable low pressure position, wherein the step piston is in a stable high pressure position in a second high pressure range and wherein the second operating connection is connectable with the supply connection in the stable high pressure position, wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position, wherein a first check valve is associated with the first operating connection and a second check valve is associated with the second operating connection, wherein the first check valve and the second check valve open or close a connection of the first operating connection or the second operating connection with the supply connection as a function of a position of the step piston, wherein the first check valve and the second check valve is are integrated into the valve housing, and wherein the first operating connection is connectable through channels in the first housing and the first check valve with the supply connection in the low pressure position of the step piston.

23. A hydraulic valve for shifting a control piston in a connecting rod of an internal combustion engine with variable compression, the hydraulic valve comprising:

a valve housing including a first operating connection, a second operating connection and a supply connection that is loadable with a hydraulic pressure of a hydraulic fluid; and a step piston that is arranged in the valve housing and displaceable by the hydraulic pressure of the hydraulic fluid against a force of a preloaded spring, wherein the step piston remains in a stable low pressure position in a first low pressure range due to a preload of the spring wherein the supply connection is connectable with the first operating connection in the stable low pressure position, wherein the step piston is in a stable high pressure position in a second high pressure range and wherein the second operating connection is connectable with the supply connection in the stable high pressure position, wherein an unstable transition range is provided between the first low pressure range and the second high pressure range wherein a shifting of the step piston from the stable low pressure position to the stable high pressure position is performed at a higher pressure than a shifting from the stable high pressure position to the stable low pressure position, wherein a first check valve is associated with the first operating connection and a second check valve is associated with the second operating connection, wherein the first check valve and the second check valve open or close a connection of the first operating connection or the second operating connection with the supply connection as a function of a position of the step piston, wherein the first check valve and the second check valve are integrated into the valve housing, and wherein the second operating connection is connectable through the second check valve and through channels in the second housing with the supply connection in the high pressure position of the step piston.

* * * * *